(12) United States Patent
Galloway et al.

(10) Patent No.: US 6,380,857 B1
(45) Date of Patent: Apr. 30, 2002

(54) SELF LEVELING UNDERGROUND MARKER

(75) Inventors: George G. Galloway, Weatherford; Ronald L. McWilliams, Mineral Wells; John Moss, Weatherford; William C. Wood, Fort Worth, all of TX (US)

(73) Assignee: Industrial Technology, Inc., Mineral Wells, TX (US)

( * ) Notice: Subject to any disclaimer, the term of this patent is extended or adjusted under 35 U.S.C. 154(b) by 0 days.

(21) Appl. No.: 09/690,072

(22) Filed: Oct. 16, 2000

(51) Int. Cl.$^7$ .................................................. G08B 13/14
(52) U.S. Cl. ................................. 340/572.8; 340/572.5; 343/719
(58) Field of Search ........................ 340/572.1, 572.5, 340/572.7, 572.8; 343/719; 324/329, 326, 323; 33/332, 398

(56) References Cited

U.S. PATENT DOCUMENTS

| | | |
|---|---|---|
| 3,373,498 A | 3/1968 | Chabbert |
| 3,683,389 A | 8/1972 | Hollis |
| 3,689,885 A | 9/1972 | Kaplan et al. |
| 3,719,950 A | 3/1973 | Bukhman et al. |
| 3,818,487 A | 6/1974 | Brody et al. |
| 3,836,842 A | 9/1974 | Zimmermann et al. |
| 3,938,044 A | 2/1976 | Lichtblau |
| 3,983,552 A | 9/1976 | Bakeman, Jr. et al. |
| 4,118,693 A | 10/1978 | Novikoff |
| 4,119,908 A | 10/1978 | Cosman et al. |
| 4,240,072 A | 12/1980 | Fowler |
| 4,260,983 A | 4/1981 | Falck et al. |
| 4,292,590 A | 9/1981 | Wilson |
| 4,293,816 A | 10/1981 | Johnson |
| 4,334,227 A | 6/1982 | Marks |
| 4,342,904 A | 8/1982 | Onasager |
| 4,482,513 A | 11/1984 | Auletti |
| 4,581,524 A | 4/1986 | Hoekman et al. |
| 4,668,912 A | 5/1987 | Junker |
| 4,712,094 A | 12/1987 | Bolson, Sr. |
| 4,761,656 A | 8/1988 | Cosman et al. |
| 4,859,991 A | 8/1989 | Watkins et al. |
| 4,873,530 A | 10/1989 | Takeuchi et al. |
| 4,894,663 A | 1/1990 | Urbish et al. |
| 4,925,605 A | 5/1990 | Petronko |
| 5,047,715 A | 9/1991 | Morgenstern |
| 5,057,844 A | 10/1991 | Rothstein |
| 5,103,234 A | 4/1992 | Watkins et al. |
| 5,121,103 A | 6/1992 | Minasy et al. |
| 5,140,334 A | 8/1992 | Snyder et al. |
| 5,258,766 A | 11/1993 | Murdoch |
| 5,276,067 A | 1/1994 | Doerge |
| 5,280,296 A | 1/1994 | Tan et al. |
| 5,281,941 A | 1/1994 | Bernstein |
| 5,319,354 A | 6/1994 | Myatt |
| 5,397,986 A | 3/1995 | Conway et al. |
| 5,426,443 A | 6/1995 | Jenness, Jr. |
| 5,497,099 A | 3/1996 | Walton |
| 5,499,015 A | 3/1996 | Winkler et al. |
| 5,539,421 A | 7/1996 | Hong |
| 5,585,811 A | 12/1996 | Jetzer |
| 5,592,182 A | 1/1997 | Yao et al. |
| 5,699,048 A | 12/1997 | Galloway |
| 5,814,986 A | 9/1998 | Goskowicz et al. |
| 6,097,293 A | 8/2000 | Galloway et al. |

*Primary Examiner*—Thomas Mullen
(74) *Attorney, Agent, or Firm*—Geoffrey A. Mantooth

(57) ABSTRACT

The marker has a housing, an inner member and a tuned circuit. The housing has a spherical cavity therein. The inner member is located inside of the housing cavity and is rotatable therein. The tuned circuit has an inductance in the form of a coil as well as a capacitance. The tuned circuit is tuned to a particular frequency. A weight is coupled with the inner member and is eccentrically located within the spherical cavity. The eccentrically located weight seeks the lowest portion of the housing cavity. Thus, when the marker is manipulated so as to disorient the tuned circuit, the weight will rotate the inner member back to its stable position so as to properly orient the tuned circuit coil.

9 Claims, 10 Drawing Sheets

SELF LEVELING UNDERGROUND MARKER

FIELD OF THE INVENTION

The present invention relates to electrical markers that are located underground for the purpose of locating buried structures.

BACKGROUND OF THE INVENTION

Buried structures include pipelines, cables, vaults, etc. Once a structure is buried in the ground, it becomes difficult to locate. Location is useful, for example, to dig up the structure for repair or to avoid the structure when performing nearby excavation or drilling.

Electrical markers are used to located buried structures. The markers are located adjacent to a structure and then are buried with that structure. In the prior art, each marker contains a tuned LC circuit. A number of markers are placed along the structure, which is then buried.

In order to locate a buried marker, an operator moves across the surface of the ground with a transmitter and a receiver. The transmitter sends out an electromagnetic signal tuned to the frequency of the marker. Upon receiving the transmitted signal, the marker resonates and thus produces an electromagnetic response. This response is received by the above ground receiver and converted to a signal that is detectable by the operator (for example, an audio tone). The operator marks the pinpointed location on the ground using paint and then moves on to find the next marker buried along the structure.

Thus, with the prior art, the location of the marker, and the location of the buried structure, can be determined.

The tuned LC circuit inside of the marker includes a coil of wire. The coil, which can have an air core or a ferrite core, has an axis that is generally perpendicular to the coil windings of wire.

In order for the buried marker to be located, the coil should be oriented so as to be horizontal, which in most instances is approximately parallel to the surface of the ground. This is because the coil has a directional response to the transmitter signal. The coil response is strongest along the axis of the coil (i.e. perpendicular to the coil). If a marker is buried with the coil axis being horizontal, then the directional response will be oriented parallel to the ground, making detection difficult. It is desirable that the directional response be perpendicular to the ground so as to extend out of the ground to the receiver.

In the prior art, there is Bolson, Sr., U.S. Pat. No. 4,712,094. Bolson, Sr. orients a coil in a tuned circuit horizontally by floating the coil on the surface of a liquid. Unfortunately, the liquid adds to the weight of the marker and complicates assembly.

SUMMARY OF THE INVENTION

It is an object of the present invention to provide an electrical marker for use in locating buried structures, which marker has a coil that will orient itself.

It is an object of the present invention to provide an electrical marker for use in locating buried structures, which marker has a coil that will orient itself horizontally.

The present invention provides a passive marker for use in locating a hidden structure. The marker comprises a housing, an inner member and a tuned circuit. The housing has a spherical cavity therein. The inner member is located inside of the housing cavity. The inner member is rotatable within the housing cavity. The tuned circuit comprises an inductance and a capacitance. The tuned circuit provides an electromagnetic response along an axis when subjected to an electromagnetic field at a selected frequency. The tuned circuit is coupled to the inner member so as to rotate with the inner member. A weight is coupled with the inner member and is eccentrically located within the spherical cavity.

The marker of the present invention automatically orients the tuned circuit in the desired orientation independently of the orientation of the outer housing. The eccentrically placed weight is pulled down to the lowest spot by gravity, thereby orienting the tuned circuit.

In one aspect of the present invention, the weight comprises a ball located in a receptacle of the inner member. A portion of the ball contacts the housing.

In another aspect of the present invention, the ball is a glass ball.

In still another aspect of the present invention, the ball is rotatably coupled to the inner member.

In still another aspect of the present invention, a portion of the ball protrudes out from the inner member.

In accordance with still another aspect of the present invention, the weight is located inside of the inner member.

In accordance with still another aspect of the present invention, the weight is located along the axis of the response of the tuned circuit.

In accordance with another aspect of the present invention, the inner member is spherical.

DESCRIPTION OF THE PREFERRED EMBODIMENTS

The marker of the present invention has a tuned circuit arrangement that levels itself, even when buried in the ground. The tuned circuit has a coil that is oriented in a horizontal plane, wherein its electromagnetical response is directed upwardly to the surface of the ground.

In the description that follows, the disclosure of the specifications and drawings of the following U.S. patents are incorporated herein by reference: Galloway, U.S. Pat. No. 5,699,048, Bolson, Sr., U.S. Pat. No. 4,712,094.

Figure 1:
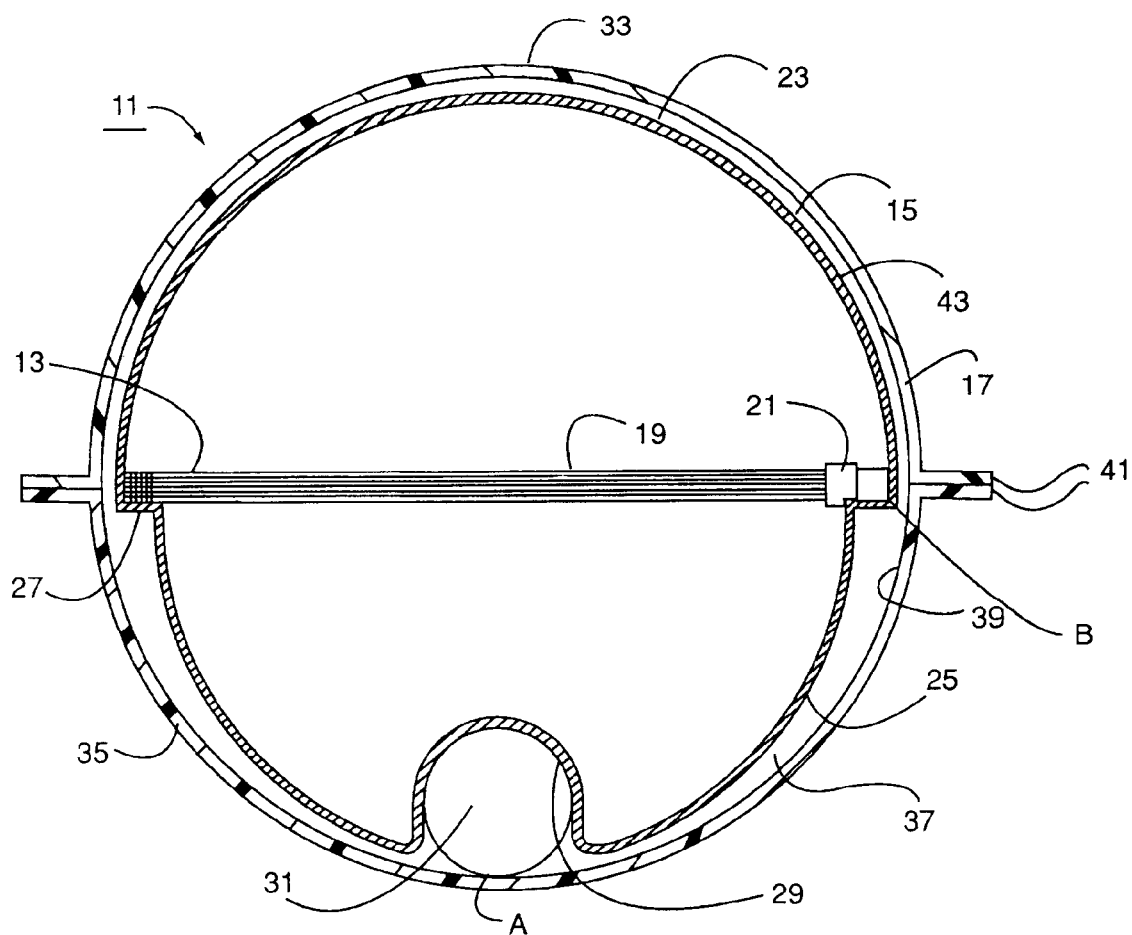
FIG. 1 is a cross-sectional view of a marker of the present invention, in accordance with a preferred embodiment.

Referring to FIG. 1, the marker 11 of the present invention includes a tuned circuit 13, an inner member 15 and a housing 17 (or enclosure).

The tuned circuit 13 has a coil 19 and a capacitor 21. The coil 19 is made of copper wire (or some other conductor) and has an air core. In an alternate embodiment, a solid core (such as iron or ferrite) can be used for each coil. To make the coil, the wire, which is insulated, is wrapped around a mandrel. The individual turns of wire are then coupled together by an adhesive or some other means. For example, the wire can be heated and then cooled to cause a bonding material to melt and then fuse to the adjacent bonding material. The individual turns of wire remain insulated. After fusing the wires together, the coil is pulled off of the mandrel. The coil forms a unitary band structure. The coil need not be circular. The coil is resilient to minor deformations of its shape. Thus, the coil can be pressed into an oval shape and upon release will resume its circular shape.

Figure 10:
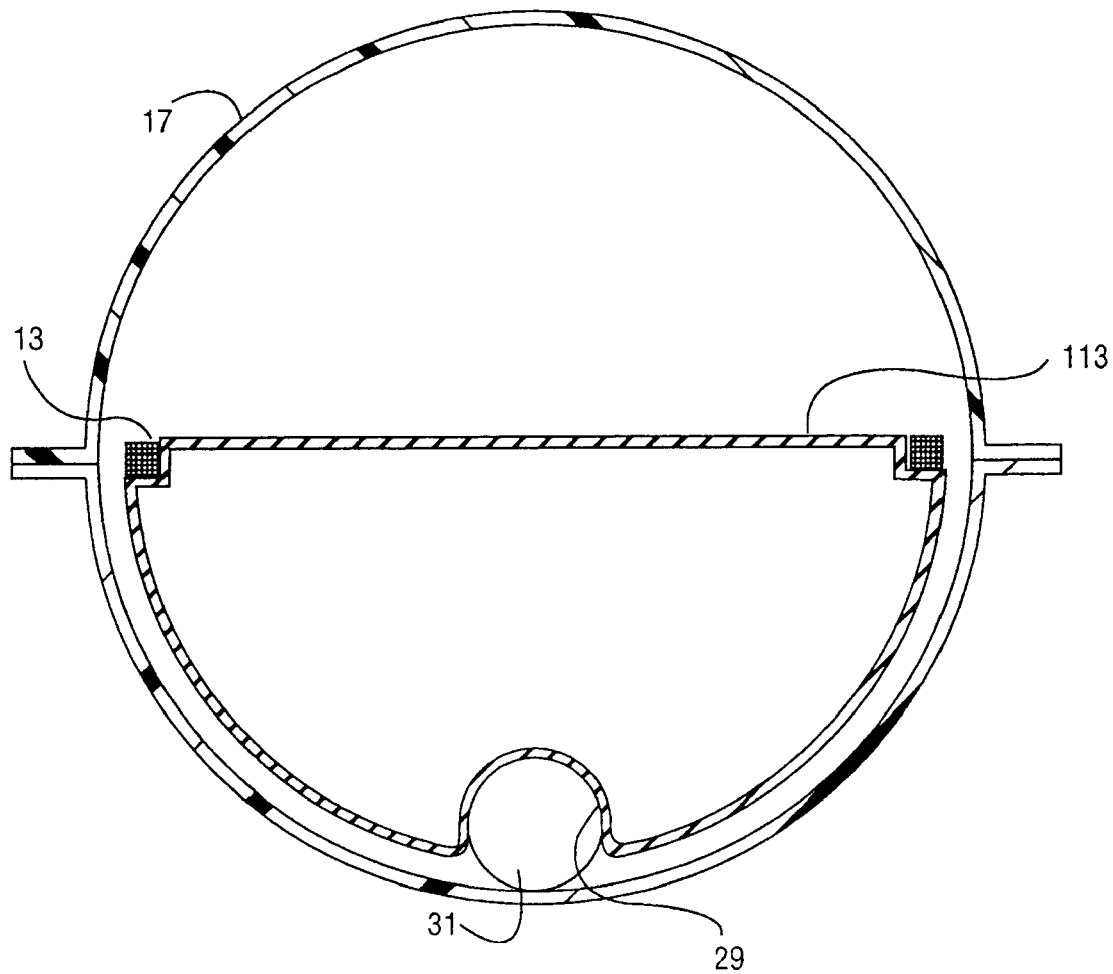
FIG. 10 is a cross-sectional view of a marker in accordance with another embodiment.

The above description for winding a coil presents a rigid coil that can be wound independently of the marker housing and then coupled to the inner member. Alternatively, wire can be wound around an inner member. For example, as shown in FIG. 10, the coil wire can be wound around the inner member 113. In such an instance, the inner member becomes a permanent mandrel for the coil.

The capacitor 21 is electrically connected across the two ends of the coil wire. Thus, the capacitor is in parallel with the coil. The capacitor can be located within the inside diameter of the coil and can be coupled thereto by tape, adhesive, etc. Together, the coil and the capacitor make up a tuned circuit that is tuned to a particular frequency.

The tuned circuit 13 is coupled to the inner member 15. The inner member 15 has two hemispherical portions, namely an upper portion 23 and a lower portion 25. In its normal, at rest, orientation, the upper portion is above the lower portion as shown in FIG. 1. In the embodiment shown in FIG. 1, the outside diameter of the upper portion 23 is larger than the outside diameter of the lower portion 25. A shoulder 27 is formed between the upper and lower portions. The tuned circuit 13 is coupled to the shoulder by adhesive. Alternatively, the tuned circuit can be part of a foam subassembly that fits within the inner member. Forming such a subassembly incorporating a tuned circuit and a foam core or mandrel is taught in Galloway, U.S. Pat. No. 6,097,293. In FIG. 1, the tuned circuit 13 is coupled to the inside portion of the shoulder 27. Alternatively, the tuned circuit 13 can be coupled to the outside portion of the shoulder 27.

The lower portion 25 has at the bottom a receptacle 29 for receiving a ball 31 or sphere. The ball 31 is preferably nonmetallic so as to avoid interference with the electrical field of the tuned circuit 13. In the preferred embodiment, the ball 31 is a glass marble. A glass marble has a slick, low friction surface. Preferably, the ball 31 is sized to the receptacle 29 so as to rotate within the receptacle. However, the ball need not rotate and it can be glued into the receptacle. Also, a portion of the ball 31 protrudes from the receptacle 29.

The inner member 15 can be made up of two discrete portions for manufacturing purposes. The upper and lower portions 23, 25 can be injection molded plastic and welded together. The inner member need not provide a fluid tight enclosure for the tuned circuit, as the housing 17 will provide such a fluid tight enclosure.

The housing 17 encloses the tuned circuit 13 and the inner member 15, protecting them from the environment. In the preferred embodiment, the housing is made up of first and second hemispherical portions 33, 35. Like the inner member, the housing portions are plastic or some other nonconductive material.

The housing 17 forms a hollow enclosure, with a cavity 37 therein. The cavity 37 is spherical. The inside surface 39 of the housing cavity 37 is smooth. Each housing portion 33, 35 is provided with an outwardly extending flange 41 around the rim of the cavity opening. The two portions 33, 35 are joined together at the respective flanges 41.

To assemble the marker 11, the tuned circuit 13 is located in one of the inner member portions. The two portions 23, 25 of the inner member 15 are then assembled and coupled together. Then, the ball 31 is located in its receptacle 29 and the inner member and ball are placed into one of the housing portions 33, 35. The other housing portion is then added and the two housing portions are sealed together at the flanges 41. The seal is fluid tight. The seal can be made by welding the flanges 41 together or by the use of adhesive.

The marker is located next to a structure (pipeline, cable, etc.) before the structure is buried or otherwise covered. The marker housing 17 can be provided with a loop for receiving a strap, in order to secure the marker to the structure. The strap can extend through the loop and around the structure or around an anchor of some type connected to the structure.

In operation, the ball 31 acts as a weight on the inner member 15. The inner member 15 is eccentrically loaded about the tuned circuit coil 19. The lower portion has more mass than does the upper portion because the ball 31 acts or bears on the lower portion. The ball 31 always seeks the lowest spot of the cavity 37. For example, if the housing 17 is moved from the orientation of FIG. 1 (where the flanges 41 are horizontal) to an orientation where the flanges 41 are vertical, after some movement of the ball 31 and the inner member inside of the housing, the coil 19 will become stationary in a horizontal orientation. The ball 31 will be located by the joint between the flanges 41. Thus, no matter what the orientation of the housing 17 is, the ball 31 will always move to the bottom of the housing 17. This maintains the tuned circuit 13 in an orientation where the coil 19 is horizontal. The response provided by the coil 19 is always in a vertical direction, up towards the surface of the ground.

The ball 31 need not rotate with respect to the inner member 15. A nonrotating ball provides a point of contact with the surface 39 of the cavity 37. Thus, the ball merely slides or moves along this surface to reach the lowest point of the housing.

The inner member 15 is designed to be unstable in all but the preferred orientation, which is where the ball is at the lowest point of the housing. (FIG. 1 shows the inner member 15 in its stable position, assuming that the bottom of the figure is down.) Thus, if the marker is manipulated so that the ball becomes located above the lowest point of the housing, the inner member is unstable, or top heavy. The ball will cause the inner member to move to the stable orientation, with the coil properly aligned.

In order to assist the inner member 15 moving within the housing 17, a lubricant can be located between the inner member and the housing. This applies to all embodiments described and shown herein. The lubricant can be liquid, such as water, or an oil, or it can be dried, such as powered graphite. If lubricant is used, only a small amount need be used. The inner member need not float in liquid. Floating the inner member creates too much weight due to the weight of the fluid. This adds to the shipping costs for the marker. As an alternative to a lubricant, the inner member and housing can be made of a plastic (or other material) having a low surface friction. Also, having a smooth inner surface 39 in the housing and a smooth outer surface 43 on the inner member serves to reduce friction between the inner member and the housing. Reducing the amount of surface area of the inner member that is in contact with the housing also serves to reduce friction. Thus, the ball 31 in FIG. 1 has two functions, namely to provide an eccentric mass in the inner member so as to provide only a single stable position of the inner member, and to provide a small surface area of contact between the inner member and the housing so as to reduce the friction between the rotatable inner member 15 and the outer housing 17. Minimizing the friction between the inner member and the housing is desirable because the coil will orient to the horizontal much more easily. In FIG. 1, the inner member is shown somewhat ideally. In practice, it may lean slightly so as to contact the housing in two locations (for example A and B).

The outer dimensions of the inner member 15 are sized slightly smaller than the inside dimension of the housing 17. This provides sufficient freedom of movement of the inner member inside of the housing while maintaining a relatively large coil diameter. It is preferred to make the coil diameter large so as to increase the depth of detection. A larger diameter coil can typically be detected at a greater distance than a smaller diameter coil. In addition, if the ball is rotatable within the receptacle, the inner member must be sized sufficiently large so as to prevent the ball from exiting the receptacle 29 when the marker is assembled.

Figure 2:
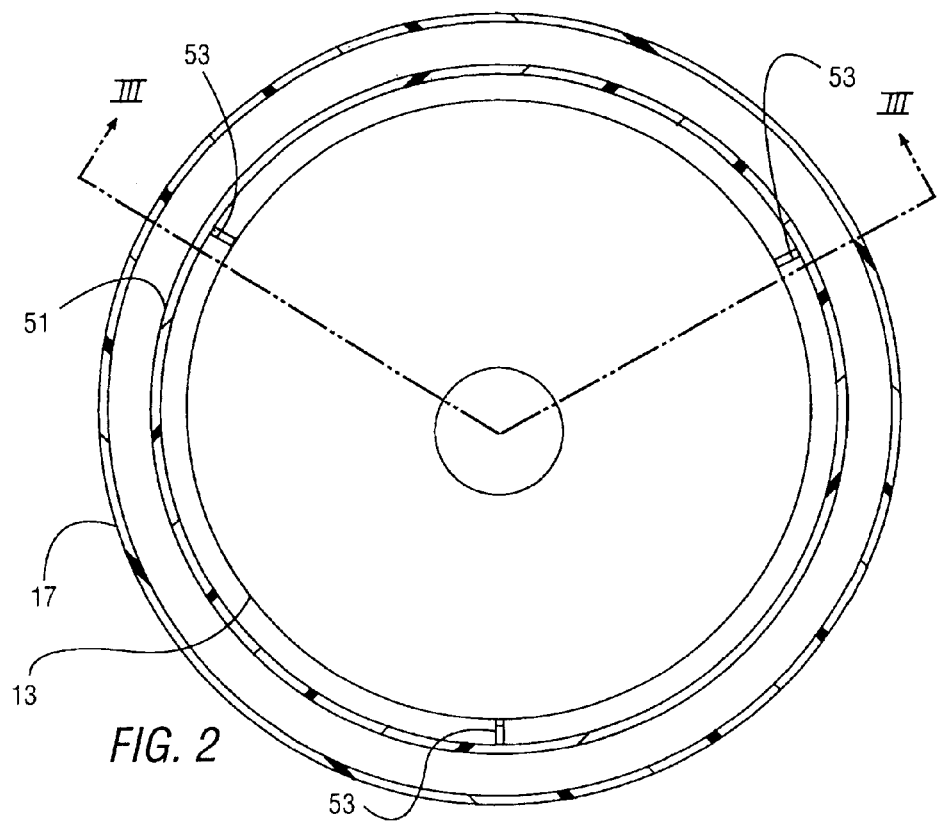
FIG. 2 is a cross-sectional view of a marker in accordance with another embodiment.
Figure 3:
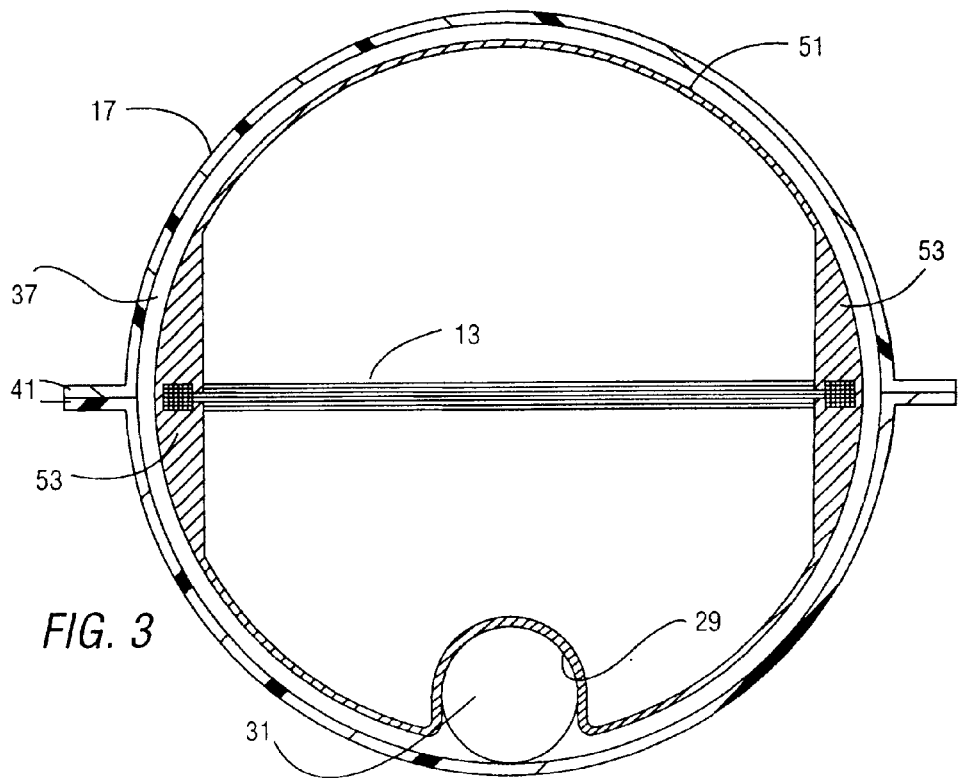
FIG. 3 is a cross-sectional view of the marker of FIG. 2, taken through lines III—III.

FIGS. 2 and 3 illustrate another embodiment of the marker. As in all of the embodiments described herein, like numbers indicate like components. For example, the housing 17 is unchanged from the embodiment of FIG. 1 to the embodiment of FIGS. 2 and 3.

The inner member 51 is different than the inner member 15 of the embodiment of FIG. 1. The inner member 51 is spherical, having an outside diameter that is somewhat less than the inside diameter of the housing cavity 37. The inner member is provided with retainers 53 for securing the tuned circuit 13 in place. The inner member 51 can be made of two portions, which open to allow the location of the tuned circuit therein. There is a receptacle 29 for receiving the ball 31 as in FIG. 1. The ball 31 protrudes out from the receptacle 29. The inner member 51 is self-orienting because the ball 31 seeks the lowest position of the housing 17.

Figure 4:
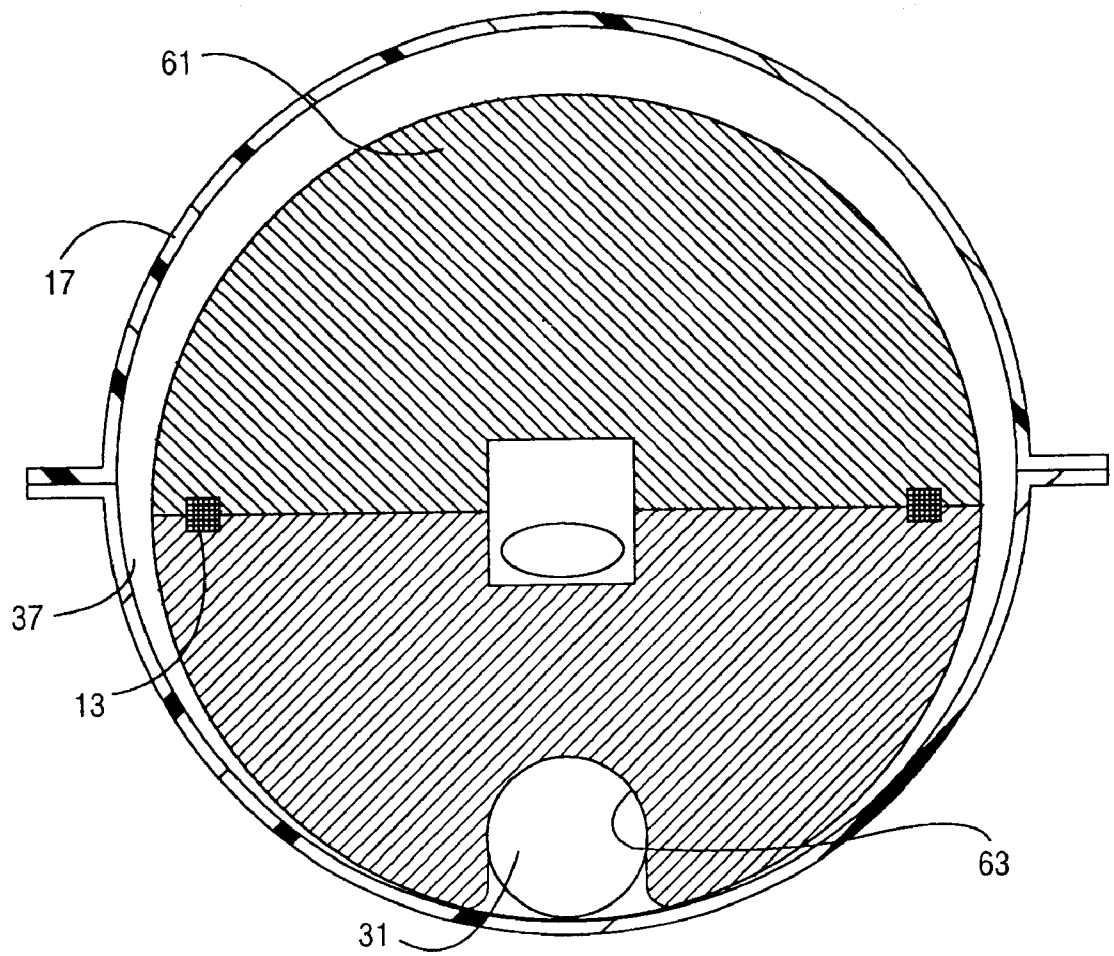
FIG. 4 is a cross-sectional view of a marker in accordance with another embodiment.

FIG. 4 illustrates another embodiment. The spherical inner member 61 is shown as being primarily solid, although it could be hollow as in FIG. 3. Alternatively, the inner member 61 could be made of foam so as to reduce its mass. Forming a foamed shape with a tuned circuit is described in U.S. Pat. No. 6,097,293. The receptacle 63 of FIG. 4 is deep so that the ball 31 does not protrude out of the receptacle as prominently as in the embodiment of FIG. 1. Thus, the inner member of FIG. 4 is more spherical than the inner member of FIG. 3. In the embodiment of FIG. 4, the ball 31 preferably rotates.

Figure 5:
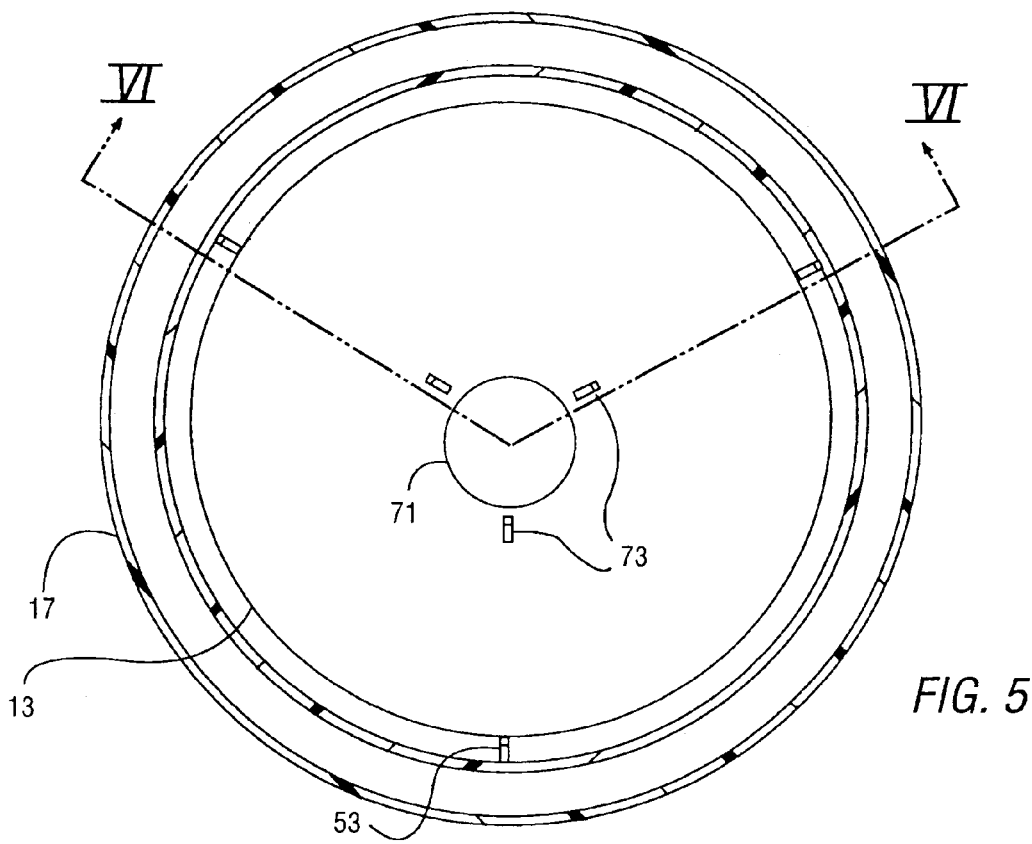
FIG. 5 is a cross-sectional view of a marker in accordance with still another embodiment.
Figure 6:
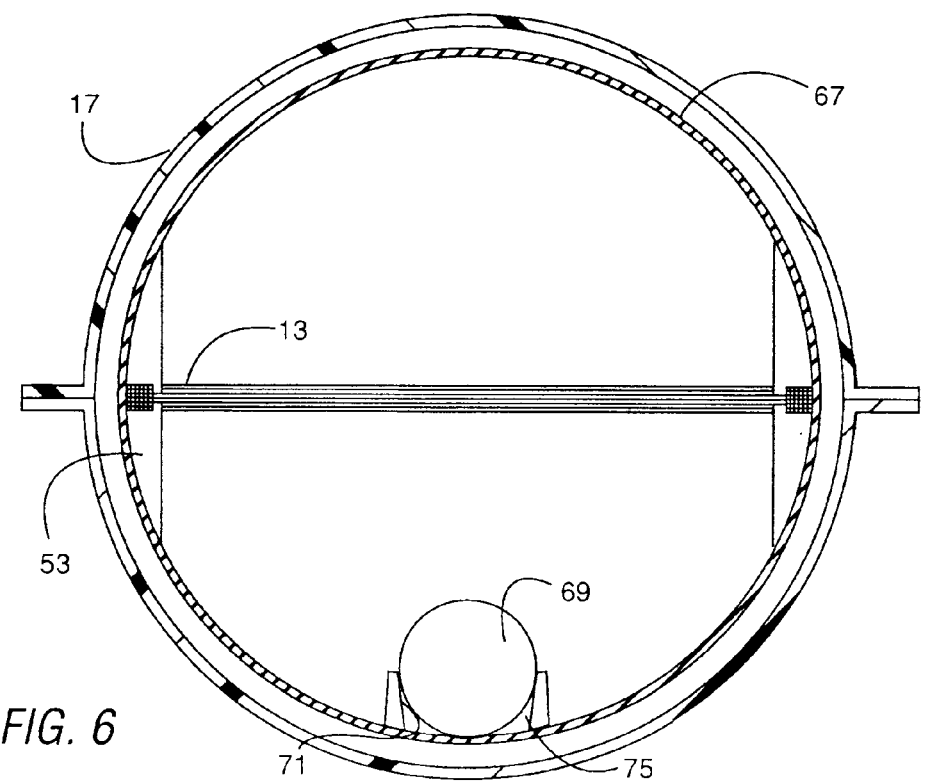
FIG. 6 is a cross-sectional view of the marker of FIG. 5, taken through lines VI—VI.

FIGS. 5 and 6 illustrate another embodiment of a spherical inner member 67. The weight 69 is located inside of the inner member 67. A cavity 71 is formed by posts 73, ring, etc. The cavity 71 receives the weight 69, such as a ball. Because the weight is not confined between the inner member and the housing, it is secured inside of the cavity with adhesive 75. The weight 69 need not be a ball.

Figure 7:
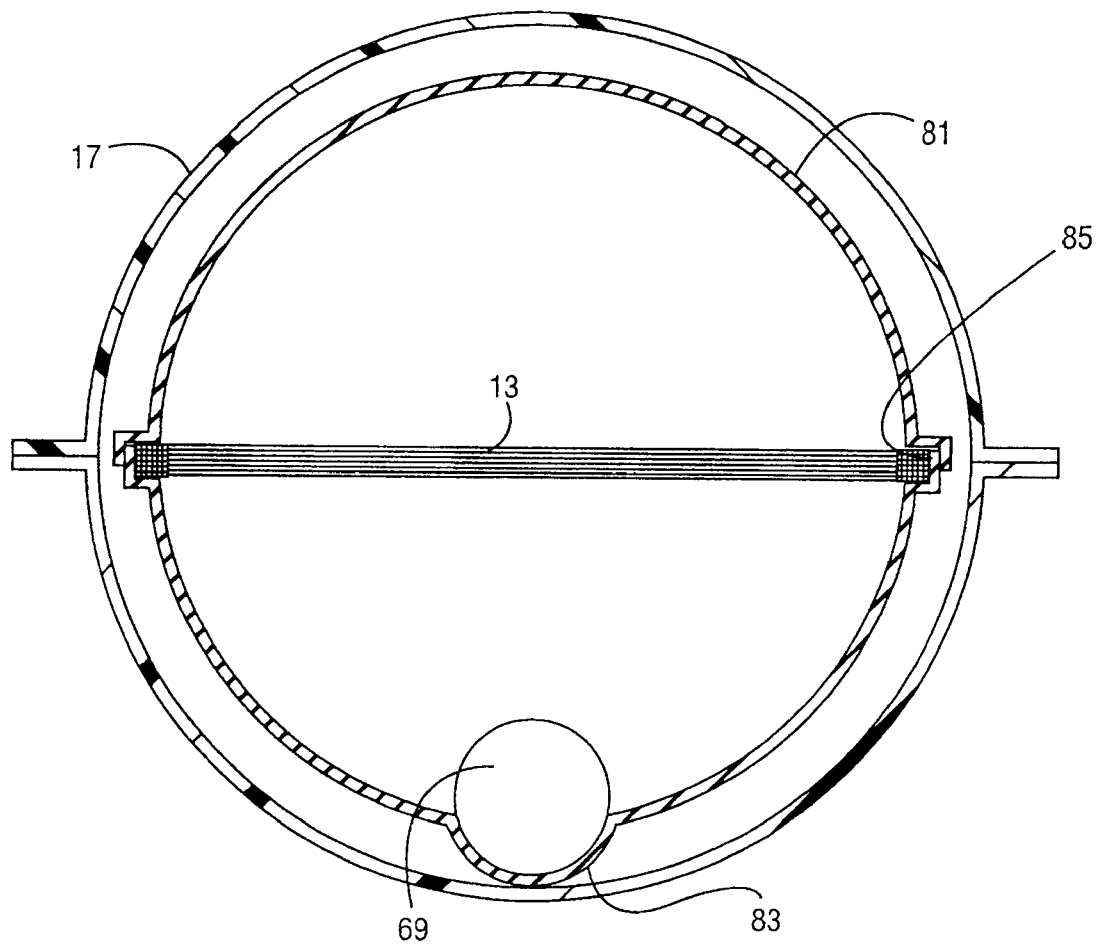
FIG. 7 is a cross-sectional view of a marker in accordance with still another embodiment.

FIG. 7 illustrates another embodiment, a variation of FIG. 6. The weight 69 is located inside of the spherical inner member 81. However, a projection 83 is formed in the outside diameter of the inner member 81. This projection 83 serves the same purpose as the ball 31 in FIG. 1; it reduces the surface area in contact between the inner member 81 of the housing 17 and thus reduces the friction. Also, in FIG. 7, the inner member has a groove 85 in the inside, formed by an increase in outside diameter. This groove 85 receives the tuned circuit 13.

Figure 8:
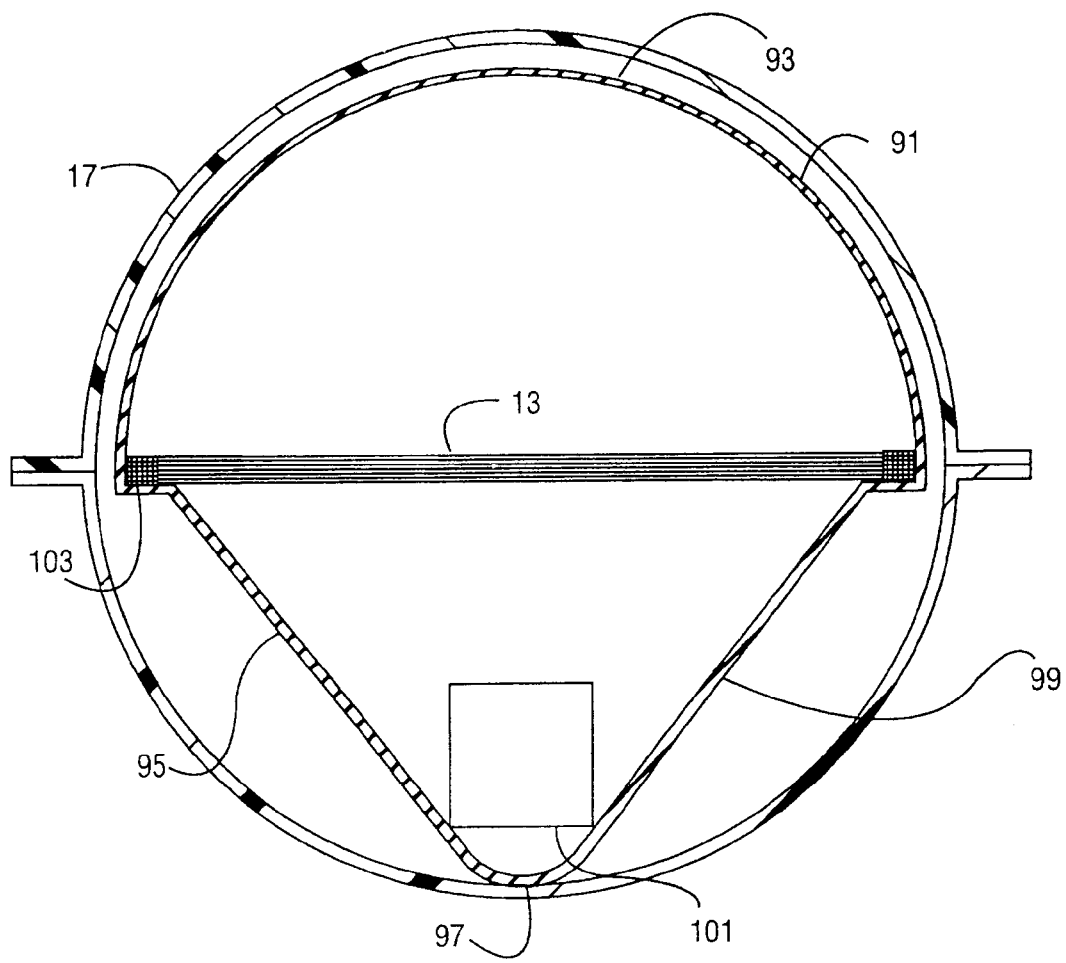
FIG. 8 is a cross-sectional view of a marker in accordance with another embodiment.

FIG. 8 illustrates a variation of FIG. 7. The inner member 91 is a variation of the inner member 81 of FIG. 7. The upper portion 93 of the inner member 91 is hemispherical in shape, as in FIG. 7. However, the lower portion 95 is not hemispherical in shape. The lower portion 95 is instead conical, with the bottom 97 of the cone being curved, much like the projection of FIG. 7. In FIG. 8, the intermediate area 99 of the lower portion of the inner member that is located between the rounded area 97 and the tuned circuit need not be spherical because this does not contact the housing 17. The points of contact between the inner member and the housing are limited to the upper portion 91 and the rounded area 97 (depending on the orientation of the inner member at any given moment). The weight 101 need not be a ball when it is inside of the inner member. The tuned circuit 13 is coupled to a shoulder 103, located between the upper and lower portions 93, 95.

Figure 9:
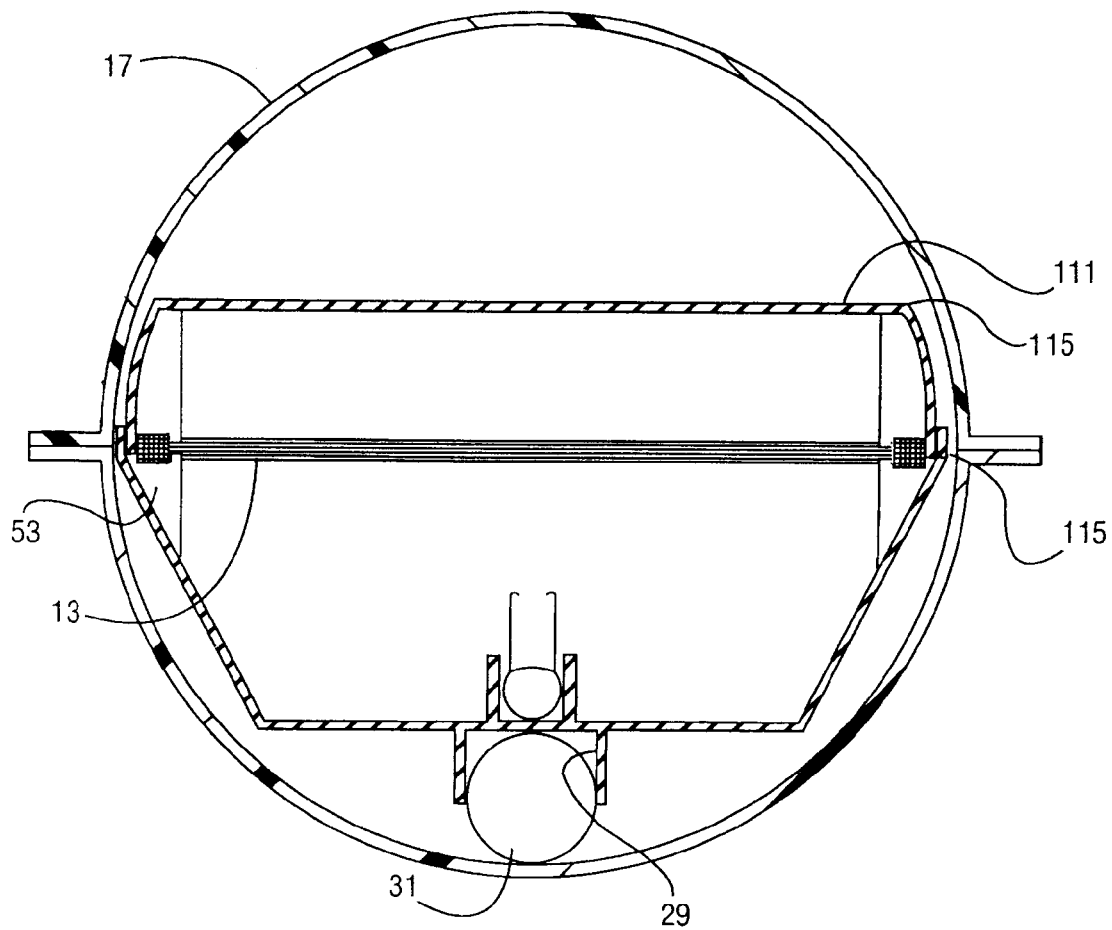
FIG. 9 is a cross-sectional view of a marker in accordance with another embodiment.

FIGS. 9 and 10 illustrate inner members 111, 113 that are approximately hemispherical. The inner member 113 of FIG. 10 is more hemispherical than the inner member 111 of FIG. 9. In FIG. 10, the tuned circuit 13 is located outside of the inner member 113. In FIG. 9, the tuned circuit 13 is located inside of the inner member 113, which has edges 115 to minimize friction with the housing.

In the embodiments discussed herein, the inner members will reorient themselves within the housings by rotating to a new position. The spherical inner members 15, 51, 61, 67, 81 and 129 rotate much like a ball within a larger ball. The inner member 91 rotates less efficiently or elegantly than the other inner members. The inner members 11 11 13, 115 rotate even less efficiently, if the housing is suddenly rotated.

Figure 11:
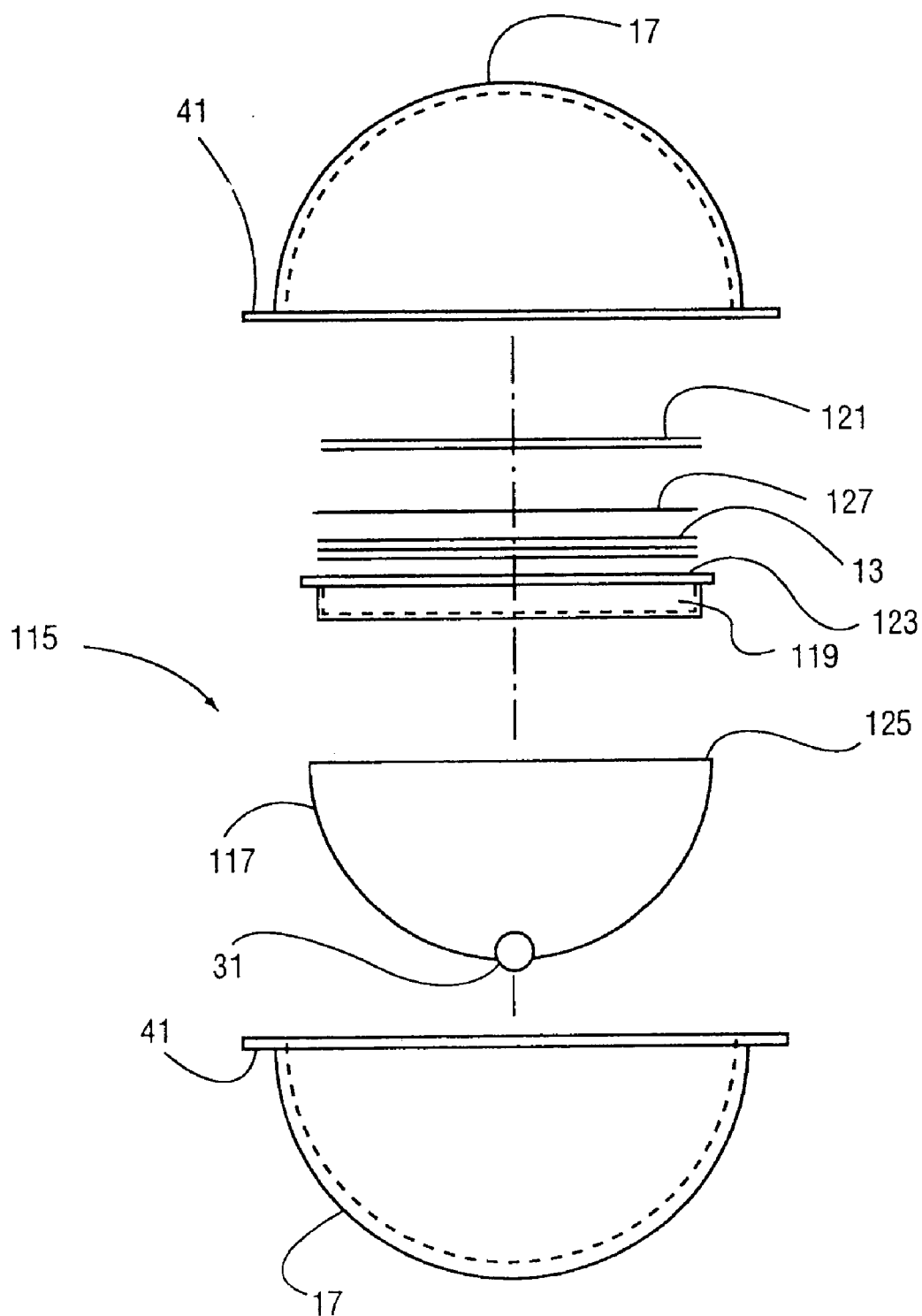
FIG. 11 is an exploded view of a marker in accordance with another embodiment.

FIG. 11 illustrates a variation of FIG. 10. The marker in FIG. 11 is shown in an exploded view. The inner view 115 includes a hollow hemisphere 117 with a ball 31 and a receptacle 29. The tuned circuit 13 is contained within a component tray 119, which tray has a cover 121. The component tray 119 fits into the inside diameter of the hemisphere. A radially extending flange 123 on the tray 119 bears on an edge 125 of the hemisphere 117. The tray 119, cover 121 and hemisphere 117 are coupled together by adhesive or plastic welding.

The housing of FIG. 11 can be made clear or transparent so that the inner member can be viewed through the housing. A label 127 can be located on the cover 121.

Figure 12:
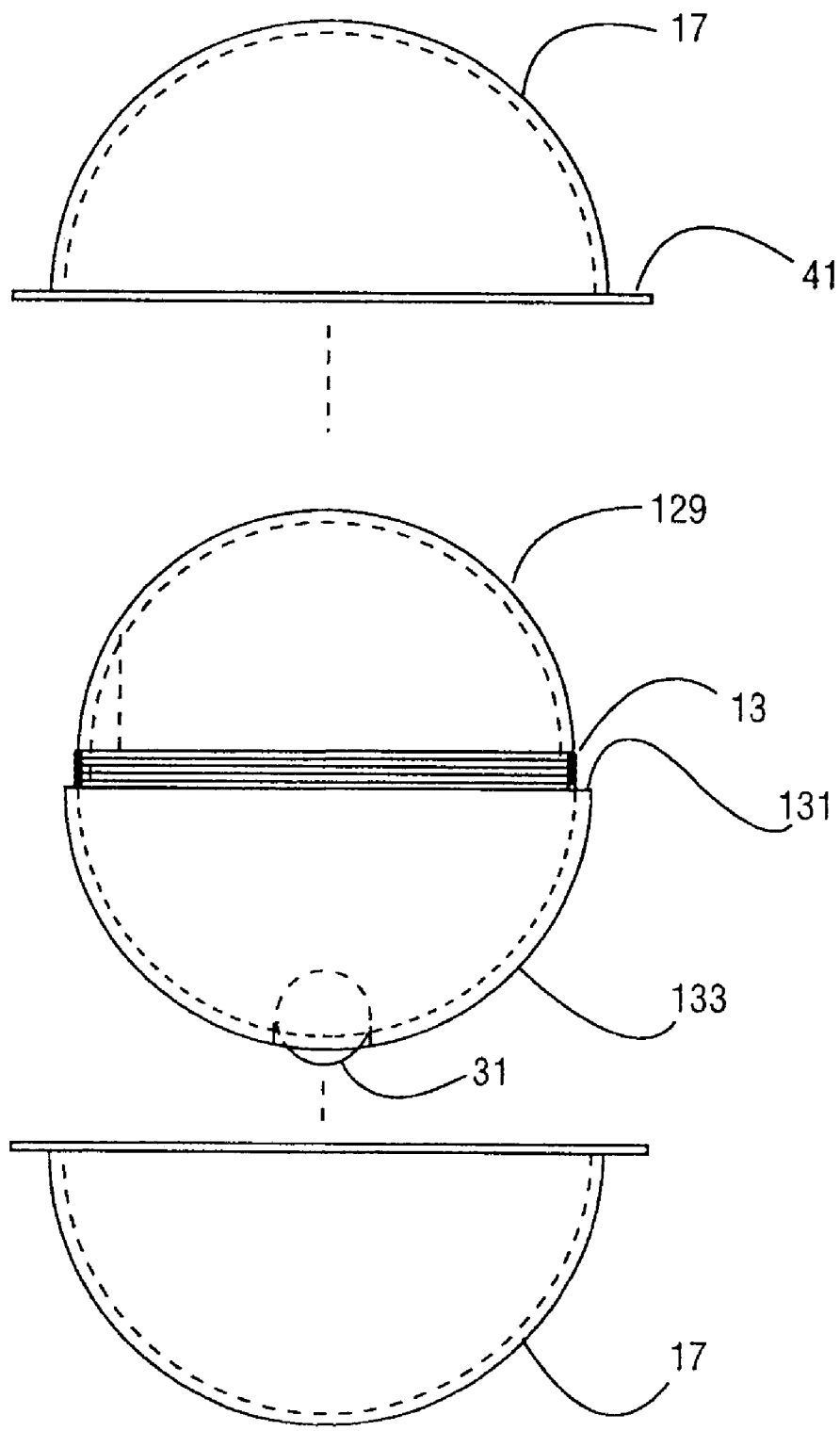
FIG. 12 is an exploded view of a marker in accordance with another embodiment.

FIG. 12 illustrates an exploded view of another embodiment. This embodiment has an inner member 129 that is similar to the inner member 15 of FIG. 1, except the tuned circuit is located on the outside shoulder 131. Also, the receptacle 21 is located in the larger portion 133.

All of the embodiments shown and described use an inner member for carrying the tuned circuit and having an eccentrically located weight. The inner member can orient itself within the housing. The weight utilizes the force of gravity to have a single stable position, wherein the weight is at the lowest position in the housing.

Although the markers have been described as orienting the coil horizontally, other orientations can be achieved. In order to orient the coil horizontally, the weight is located along an axis that is perpendicular to the plane of the coil. If another, non-horizontal, orientation was desired, then the weight would be located at some other angle with respect to the plane of the coil. For example, if a marker was to be used in a wall such as in a building or in an embankment of earth, then the coil would be oriented more vertically. In order to orient the coil vertically, the weight would be located within the plane of the coil and adjacent to one portion of the coil.

The inner members described herein can be made by injection molding. Some of the inner members can be made by vacuum forming.

In the embodiments illustrated herein, the weights and balls are shown as being located at a maximum radial distance from the tuned circuit. Such positioning enhances the self leveling feature. Alternatively, the weights could be located radially closer to the tuned circuits. However, the mass of the weight relative to the mass of the tuned circuit and inner member may have to increase in order to achieve self orientation.

Although the housing cavity 39 has been described as being spherical, it need not be perfectly so. Instead, an approximation of a spherical inside surface 39 can be utilized. For example, a geodesic dome uses light weight straight elements to form polygons, which polygons approximate a curved shape. The same principle can be applied to the inside surface 39 of the housing 17. A plurality of flat areas can be used to approximate a spherical inside surface of the cavity.

The foregoing disclosure and showings made in the drawings are merely illustrative of the principles of this invention and are not to be interpreted in a limiting sense.

What is claimed is:

1. A passive marker for use in locating a hidden structure, comprising:
   a) a housing with a spherical cavity therein;
   b) an inner member located inside of the housing cavity, the inner member being rotatable within the housing cavity;
   c) a tuned circuit comprising an inductance and a capacitance, the tuned circuit providing an electromagnetic response along an axis when subjected to an electromagnetic field at a selected frequency, the tuned circuit being coupled to the inner member so as to rotate with the inner member;
   d) a weight coupled with the inner member and being eccentrically located within the spherical cavity.

2. The marker of claim 1 wherein the weight comprises a ball located in a receptacle of the inner member, a portion of the ball contacting the housing when the inner member is in a stable orientation.

3. The marker of claim 2 wherein the ball is a glass ball.

4. The marker of claim 2 wherein the ball is rotatably coupled to the inner member.

5. The marker of claim 2 wherein a portion of the ball protrudes out from the inner member.

6. The marker of claim 1 wherein the weight is located inside of the inner member.

7. The marker of claim 1 wherein the weight is located along the axis of the response of the tuned circuit.

8. The marker of claim 1 wherein the inner member is spherical.

9. The marker of claim 1 wherein:
   a) the weight comprises a ball located in a receptacle of the inner member, a portion of the ball contacting the housing;
   b) the inner member is spherical.

* * * * *